(12) United States Patent
Williams et al.

(10) Patent No.: US 6,931,031 B2
(45) Date of Patent: Aug. 16, 2005

(54) GENERATING ELECTRONIC CARRIER SIGNALS IN THE OPTICAL DOMAIN

(75) Inventors: John Arthur Robert Williams, Birmingham (GB); Yicheng Lai, Birmingham (GB); Wei Zhang, Birmingham (GB)

(73) Assignee: Aston University, Birmingham (GB)

( * ) Notice: Subject to any disclaimer, the term of this patent is extended or adjusted under 35 U.S.C. 154(b) by 178 days.

(21) Appl. No.: 10/382,981

(22) Filed: Mar. 6, 2003

(65) Prior Publication Data

US 2003/0219257 A1 Nov. 27, 2003

(30) Foreign Application Priority Data

Mar. 6, 2002 (EP) .............................................. 02251581

(51) Int. Cl.[7] ................................................ H01S 3/00
(52) U.S. Cl. ............................. 372/1; 372/92; 372/102; 372/105; 372/106
(58) Field of Search ............................. 372/1, 92, 102, 372/105, 106

(56) References Cited

U.S. PATENT DOCUMENTS

| | | | |
|---|---|---|---|
| 5,134,620 A | * 7/1992 | Huber | ........................... 372/6 |
| 5,295,209 A | * 3/1994 | Huber | ......................... 385/37 |
| 5,511,083 A | 4/1996 | D'Amato et al. | |
| 5,844,927 A | 12/1998 | Kringlebotn | |
| 6,151,429 A | * 11/2000 | Kristensen et al. | ........... 385/11 |

OTHER PUBLICATIONS

Zhang et al., "A fibre grating DFB laser for generation of optical microwave signal", Optics & Laser Technology, Elsevier Science Publishers BV, vol. 32, No. 5, Jul. 2000, pp 369/371, XP004219832, ISSN: 0030–3992.

Agrawal et al., "Phase–Shifted Fiber Bragg Gratings and their Application for Wavelength Demultiplexing", IEEE Photonics Technology Letters, IEEE, vol. 6, No. 8, Aug. 1, 1994, pp 995–997, XP000465504, ISSN: 1041–1135.

* cited by examiner

*Primary Examiner*—Min Sun Harvey
*Assistant Examiner*—Delma R. Flores-Ruiz
(74) *Attorney, Agent, or Firm*—Altera Law Group, LLC

(57) ABSTRACT

A dual wavelength optical fiber distributed feedback laser comprises a pump laser coupled to a birefringent fiber in which a first grating device (two co-located single phase-shift fiber Bragg gratings (FBGs)) is provided. The grating device gives the laser two potential lasing modes in each of two orthogonal polarization states. A polarization mode coupling FBG selects two orthogonally polarized modes on which the laser oscillates. In a photonic data carrying signal source, the laser is coupled to a polarization dependent, optical modulator operable to apply a modulation, at a data signal frequency, to one polarization mode of the laser output. In an optical waveguide based electronic signal transmission system the modulated and un-modulated polarization modes output from the source are transmitted across a fiber transmission line to a polarizing optical fiber in which the two modes heterodyne to generate an electronic carrier signal in the optical domain.

18 Claims, 7 Drawing Sheets

GENERATING ELECTRONIC CARRIER SIGNALS IN THE OPTICAL DOMAIN

RELATED APPLICATION

This application claims priority from European Patent Application Ser. No. 02251581.1, filed on Mar. 6, 2002, which is incorporated herein by reference.

FIELD OF THE INVENTION

The invention relates to the generation of electronic carrier signals in the optical domain, and specifically to a dual wavelength optical waveguide laser and to photonic data carrying signal generation and transmission.

BACKGROUND OF THE INVENTION

Optical fiber microwave systems offer an effective method for delivery of broadband wireless communication services. Optical fiber microwave systems are used in applications such as personal communications networks, millimeter-wave radio local area networks, broadband video distribution networks and signal distribution for phased array antennas. These systems could therefore play an important role in metropolitan area telecommunications networks. A key requirement of optical fiber microwave systems is an efficient technique for the optical generation of the microwave or millimeter-wave carrier signal.

Laser diodes have been looked at for this application, but they generally cannot be modulated at millimeter-wave frequencies. The use of external optical modulators has also been considered, since they can be modulated at millimeter-wave frequencies, but optical insertion loss is large and frequency-dependent. In addition, the direct modulation of a laser source and the amplitude modulation of an optical carrier signal by an external optical modulator result in the generation of dual side bands located on either side of the optical carrier and spaced from the optical carrier by the modulation frequency. As the optical signals propagate along an optical fiber the effects of chromatic dispersion result in a phase mismatch between the two sidebands, which leads, when a $\pi$ phase mismatch occurs, to power nulls at the receiver. The effects of chromatic dispersion therefore limit the transmission distance to a short distance (approximately 4 kilometers for a 30 GHz modulation frequency on a 1550 nm optical carrier signal propagating in standard monomode fiber).

Another potential photonic carrier signal source consists of the heterodyning of the optical output signals from two lasers whose frequencies (wavelengths) differ by the required millimeter-wave frequency. This technique is currently favoured because it means that baseband (data) modulation need be applied to only one of the laser signals, and the limitations imposed by fiber dispersion on the signal transmission are greatly alleviated. Implementations of this technique include frequency locking, injection locking and the use of an optical phase locked-loop.

However, the heterodyning of the optical outputs from two separate lasers faces the problem that the phase noise on each of the laser signals is uncorrelated and this leads to the photonic carrier signal having an electrical linewidth which is greater than its optical linewidth. Even using an optical phase locked-loop will only stabilise the low frequency microwave phase variations in the photonic carrier signal as a result of the limiting delays in the feedback circuit.

Another potential photonic carrier signal source is the fiber laser since these generally offer bandwidths of the order of tens of kilohertz, potentially providing a photonic signal having a reasonably low frequency phase noise. In previously reported photonic signal sources using fiber grating-based lasers, the two optical frequencies originate from different optical cavities, resulting in high frequency phase noise on the generated photonic carrier signal. In another approach, using a multimode laser, the oscillating modes are generated in a single cavity. This results in each mode having a different amount of phase noise and competition between the two modes could destroy the heterodyning.

SUMMARY OF THE INVENTION

There remains a need, therefore, for a photonic source that can generate an optical output at two closely spaced wavelengths, having a narrow intrinsic optical linewidth. In one approach according to the present invention, a waveguide laser is capable of lasing at two different modes, in each of two different orthogonal polarization states, giving a total of four different potential lasing modes. The selection of a pair of orthogonally polarized modes results in the laser operating at two orthogonally polarized lasing modes, at two closely spaced wavelengths, without suffering mode competition within the laser cavity. Since the two lasing modes oscillate within substantially the same optical cavity, both modes have the same phase noise, resulting in a narrow optical linewidth.

In one particular embodiment of the invention, a dual wavelength optical waveguide laser comprises a first optical waveguide containing an optical gain medium. The waveguide includes a first grating section in which a first optical waveguide grating device is provided. The first optical waveguide grating device has a periodic refractive index variation which gives the first optical waveguide grating a spectral profile having two passbands located within a stopband. The first grating section is birefringent. The first optical waveguide grating device defines at least one distributed optical waveguide laser cavity. The first optical waveguide is optically coupled at one end to a second optical waveguide including a second grating section in which a second, mode-selecting optical waveguide grating device is provided. The first optical waveguide grating device, in combination with the birefringence of the first grating section, gives rise to two potential lasing modes of a first polarization state and two potential lasing modes of a second polarization state orthogonal to the first polarization state, each potential lasing mode being of a different wavelength. The second optical waveguide grating device selects two orthogonal modes for the laser to lase at. A pump laser, operable to generate a pump optical signal, is in optical communication with the first optical waveguide.

The spectral bandwidths of the passbands may be narrow with respect to the spectral bandwidth of the stopband.

The periodic refractive index variation of the first optical waveguide grating device may include two phase-shifts which respectively give rise to the two passbands within the spectral profile.

The birefringence of the first grating section may comprise inherent birefringence in the first optical waveguide. Alternatively, or additionally, the birefringence of the first grating section may comprise induced birefringence in the first optical waveguide, the birefringence being induced during fabrication of the first optical waveguide grating device.

The two phase-shifts in the periodic refractive index variation of the first optical waveguide grating device and the birefringence of the first grating section together give the first optical waveguide grating device a spectral profile having four passbands, each having a different resonant wavelength, being two passbands corresponding to the fast axis of the first grating section and two passbands corresponding to the slow axis, the dual wavelength optical waveguide laser thereby having four potential lasing modes each having a different wavelength, namely two modes of a first polarization, and two modes of the orthogonal polarization.

The first optical waveguide may be a rare earth doped optical waveguide, and may be a rare earth doped optical fiber, such as erbium-ytterbium co-doped optical fiber.

The first optical waveguide grating device may comprise a single optical waveguide grating having two phase-shifts within its periodic refractive index variation.

The first optical waveguide grating device may alternatively comprise two optical waveguide gratings, each having a single phase-shift within their periodic refractive index variation, the gratings being co-located within the first grating section, and thus being substantially superimposed on one another, thereby defining two co-located distributed feedback optical waveguide laser cavities. One or more of the waveguide gratings may be a fiber Bragg grating.

The second optical waveguide grating device may be a polarization mode-coupling optical waveguide grating. The second optical waveguide grating device may be a polarization mode-coupling fiber Bragg grating. The second optical waveguide may be a high birefringence optical waveguide, and may be a high-birefringence optical fiber, such as bow-tie high birefringence optical fiber.

The polarization mode-coupling optical waveguide grating may have an optical spectrum having first and second reflection peaks, corresponding to the fast axis and the slow axis of the waveguide respectively. The wavelengths corresponding to the first peak include the wavelength of one of the two potential lasing modes of the first polarization state of the laser and the wavelengths corresponding to the second peak include the wavelength of one of the two potential lasing modes of the orthogonal polarization state of the laser. Light in one of the two potential lasing modes of the first polarization state is reflected by the polarization mode-coupling grating, and is thus selected, and light in the other mode is unaffected by the grating, and is therefore transmitted and thus rejected. Light in one of the two potential lasing modes of the orthogonal polarization state is reflected by the grating, and is thus selected, and light in the other mode is unaffected by the grating, and is therefore transmitted and thus rejected. The polarization mode-coupling grating thereby acts, by polarization mode-coupling, to select two modes of orthogonal polarization states for the laser to lase at.

The first optical waveguide grating device may be coupled to a wavelength tuning device operable to change the birefringence of the first grating section, thereby changing the resonant wavelength of one or both of the passbands corresponding to at least one of the phase-shifts in the first optical waveguide grating device.

The polarization mode-coupling optical waveguide grating may be coupled to a wavelength tuning-device operable to change the birefringence of the second grating section, thereby changing the resonant wavelength of one or both of the reflection peaks of the grating, thus enabling a user to select at which pair of orthogonally polarized, potential lasing modes the laser will operate.

The wavelength tuning device is preferably a heating element, such as a Peltier device.

The pump laser may be a laser diode, and may be operable to generate an optical output having a wavelength of approximately 980 nanometers.

The first optical waveguide grating device may be fabricated using the ultra-violet inscription phase-mask fabrication technique or the ultra-violet two-beam interference holographic fabrication technique. The second optical waveguide grating device may be fabricated using the ultra-violet inscription phase-mask fabrication technique or the ultra-violet two-beam interference holographic fabrication technique.

A photonic data carrying signal source has a dual wavelength optical waveguide laser. The optical output signal from the laser is optically coupled to a polarization dependent optical modulator operable to apply a data signal to a selected one of the two orthogonal polarization modes of the optical output signal from the laser by applying an amplitude and/or a phase modulation at the data signal frequency to the selected mode.

The polarization dependent optical modulator may be a gallium arsenide planar optical modulator. The optical modulator may be preceded by a polarization controller operable to rotate the polarization axes of the two orthogonal polarization modes of the optical output signal from the laser so that the polarization axes of the two modes lie within the operating parameters of the optical modulator.

An optical waveguide based electronic signal transmission system comprises a photonic data carrying signal source. The data carrying optical output signal from the signal source is optically coupled to an optical waveguide transmission line. A receiver is optically coupled to the transmission line at its distal end. The receiver includes an optical polarizer having a propagation axis orientated at an angle of substantially forty-five degrees to the polarization axes of the two orthogonal polarization modes of the data carrying optical output signal from the signal source. Upon propagation through the optical polarizer, the two orthogonal polarization modes heterodyne to thereby generate an electronic carrier signal in the optical domain. The beat frequency of the electronic carrier signal is determined by the wavelength separation between the two orthogonal polarization modes. The electronic carrier signal is modulated at the data signal frequency.

The optical polarizer may be a polarizing optical waveguide, and may be a polarizing optical fiber. The optical polarizer may alternatively be a bulk optic polarizer. The receiver may further comprise a polarization controller, preceding the optical polarizer, operable to rotate the polarization axes of the two orthogonal polarization modes so that the polarization axes of the two modes are orientated at an angle of substantially forty-five degrees to the propagation axis of the optical polarizer.

The receiver preferably further comprises an optical detector in optical communication with the output of the optical polarizer. The optical detector is operable to detect the electronic carrier signal in the optical domain and convert it into an electrical signal.

The beat frequency of the electronic carrier signal in the optical domain preferably lies within the radio frequency, microwave or millimeter wave frequency ranges. The frequency of the data signal is preferably low compared to the beat frequency of the electronic carrier signal.

In another embodiment of the invention, a dual wavelength optical waveguide laser comprises a first optical waveguide having an optical gain medium and a first grating section. The first grating section comprises a first optical waveguide grating device having a periodic refractive index variation that gives the first optical waveguide grating device a spectral profile having two passbands located within a stopband. The first grating section is birefringent and the first optical waveguide grating device further comprises at least one distributed laser cavity the first optical waveguide grating device thereby defining two potential oscillation wavelengths of a first polarization state and two potential oscillation wavelengths of a second polarization state orthogonal to the first polarization state, each potential oscillation wavelength being different. A second optical waveguide is optically coupled to one end of the first optical waveguide. The second optical waveguide comprises a second grating section, a second, mode-selecting optical waveguide grating device being provided in the second grating section. The second optical waveguide grating device selects a pair of orthogonally polarized oscillating wavelengths for oscillation.

BRIEF DESCRIPTION OF THE FIGURES

Embodiments of the present invention will now be described in detail, by way of example only, with reference to the accompanying drawings, in which.

Figure 1:
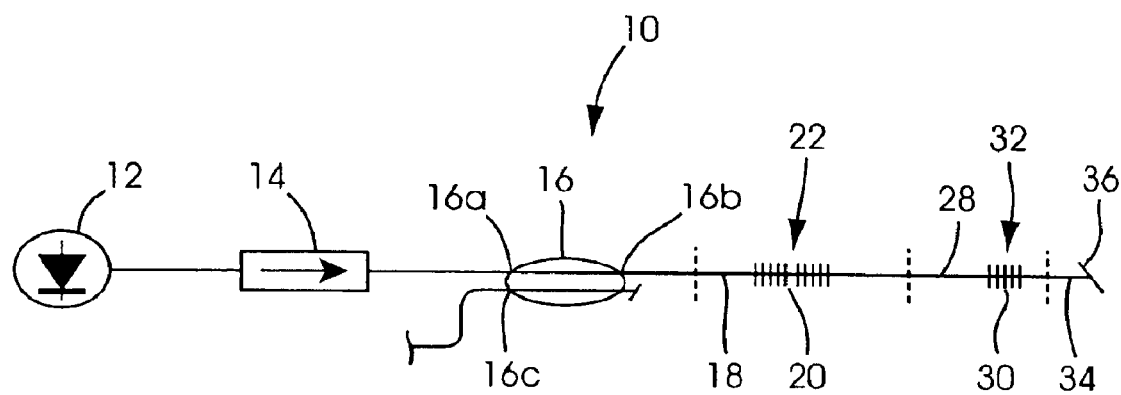
FIG. 1 is a diagrammatic representation of a dual wavelength optical waveguide laser according to a first aspect of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Referring to FIGS. 1–8 of the drawings, one particular embodiment of the invention is directed to a dual wavelength optical waveguide laser, which in this example takes the form of a dual wavelength fiber grating distributed feedback (DFB) laser 10, constructed as follows. A pump laser diode 12 is optically coupled, via a 980 nm optical fiber isolator 14, to a first port 16a on one side of a 980 nm/1550 nm wavelength division multiplexed (WDM) fiber coupler 16. The pump laser diode 12 is operable to generate a laser output signal having a wavelength of 980 nm. The isolator 14 reduces the possibility of any back-reflections from the other components of the laser 10 from disturbing the pump laser 12.

A first port 16b on the other side of the WDM coupler 16 is coupled to a first optical waveguide, which in this example takes the form of an erbium-ytterbium (Er—Yb) co-doped optical fiber 18. A first optical waveguide grating device 20, which in this example comprises two co-located fiber Bragg gratings having a single phase-shift in each of their periodic refractive index variations ("single phase-shift gratings"), is provided within a grating section 22 of the Er—Yb fiber 18. The second port 16c on the first side of the WDM coupler 16 forms the output of the laser 10.

The Er—Yb co-doped fiber 18 is coupled at its distal end to a second optical waveguide, which in this example takes the form of bow-tie high birefringence (hi-bi) optical fiber 28. A short length of standard single mode optical fiber (SMF) 34 is fusion-spliced to the distal end of the hi-bi fiber 28. The free end 36 of the SMF 34 is index-matched to avoid any end-face reflections destabilising the laser cavity.

Figure 2:
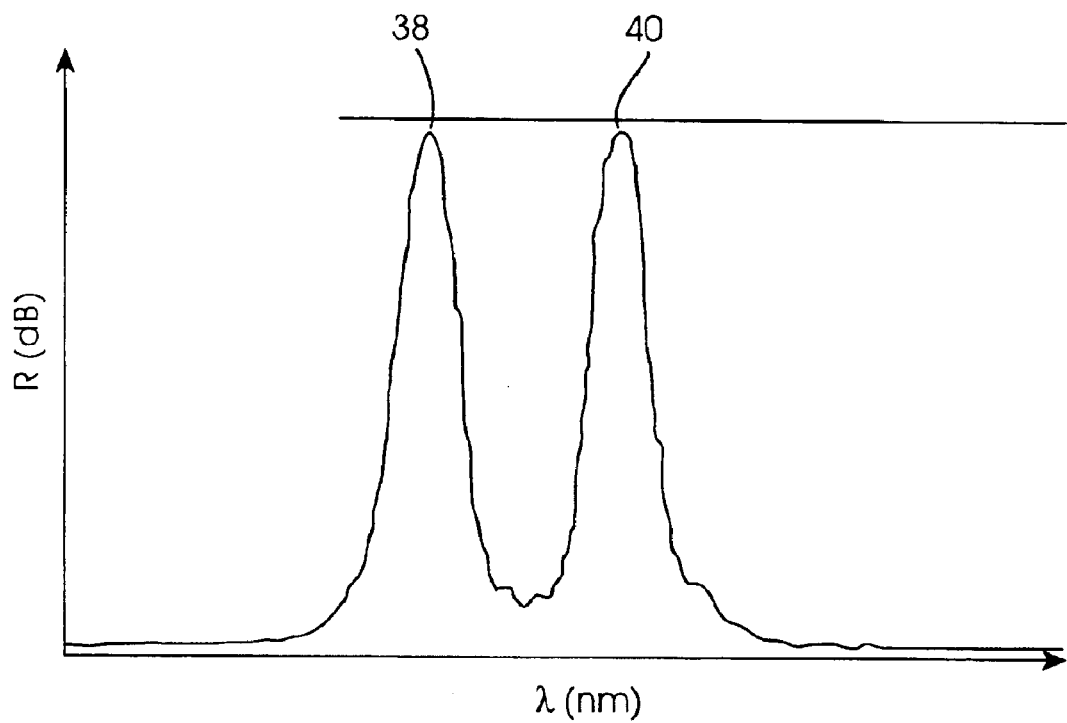
FIG. 2 shows the theoretical spectral profile of a polarization mode-coupling optical fiber grating, fabricated on high birefringence optical fiber, suitable for use as the second optical waveguide grating device in the laser of FIG. 1.
Figure 3:
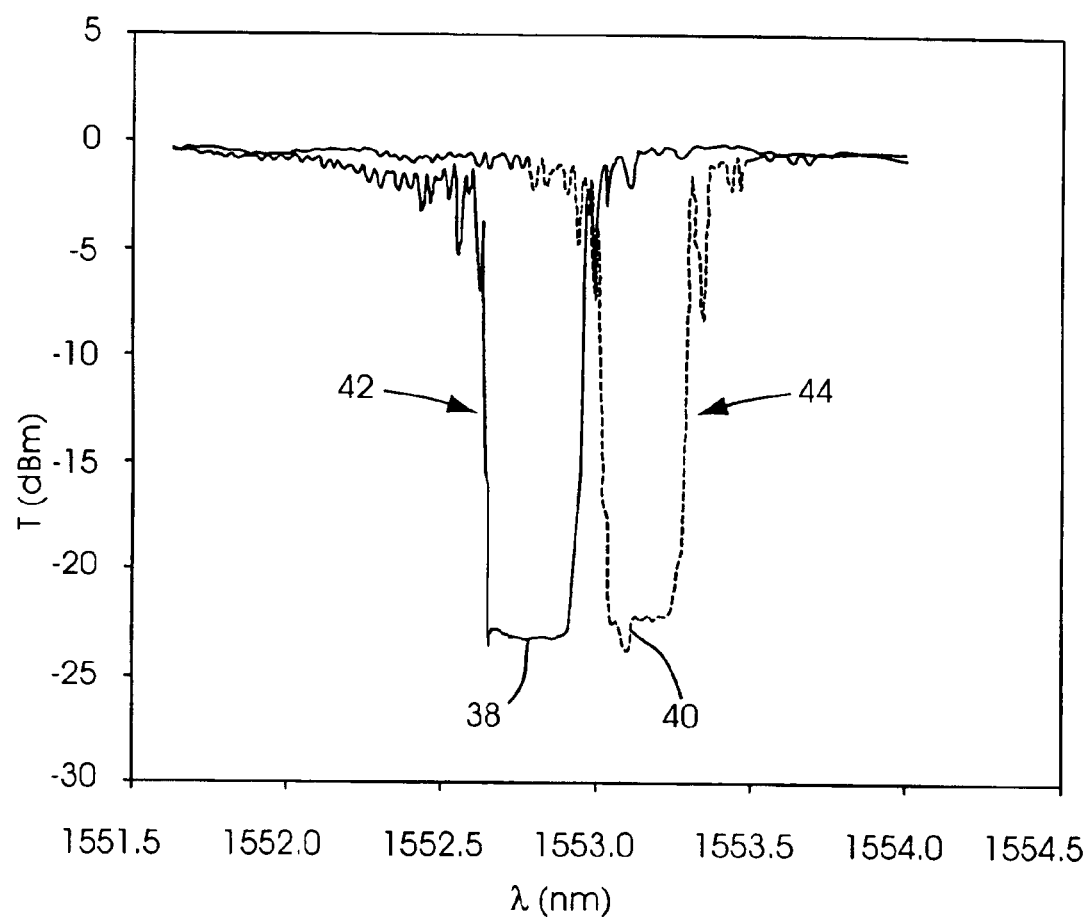
FIG. 3 shows the spectral profile of the fiber Bragg grating, fabricated on bow-tie high birefringence optical fiber, used as the second optical waveguide grating device in the laser of FIG. 1.

A second, mode-selecting, optical waveguide grating device, which in this example takes the form of a mode coupling fiber Bragg grating 30, is provided in a grating section 32 of the hi-bi fiber 28. The theoretical spectral profile in reflection (R) of a fiber Bragg grating fabricated in hi-bi fiber, having two reflection peaks 38, 40, is shown in FIG. 2. A typical spectral profile in reflection (R) of a real hi-bi fiber Bragg grating 30 is shown in FIG. 3. The hi-bi grating 30 has a length of 1 cm and has two reflection peaks 38, 40 at 1552.80 nm and 1553.13 nm, with full width, first zero (FWFZ) line widths of 0.31 nm. The spectral profile of the hi-bi grating 30 is determined by measuring the spectral response of the grating 30 at each polarization 42, 44. The spectral responses are then superimposed to give an accurate representation of the spectral profile of the hi-bi grating 30.

The gratings 20, 30 may be fabricated using the UV phase mask inscription technique. Alternatively, the gratings 20, 30 may be fabricated using the UV two-beam holographic inscription technique. Both fabrication techniques will be well known to persons skilled in the art and so they will not be described any further here.

Figure 4:
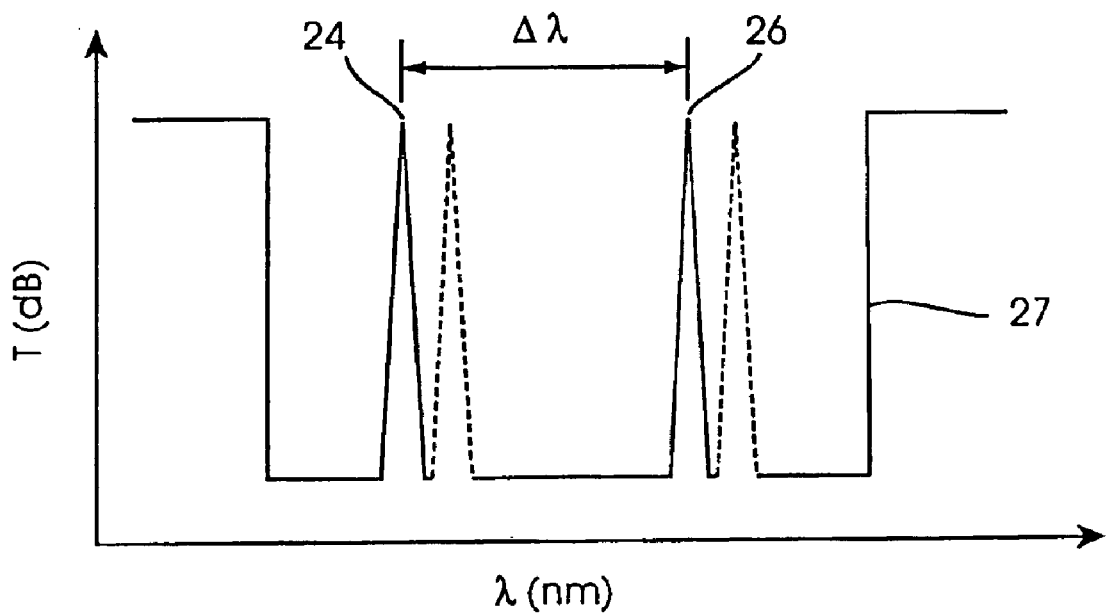
FIG. 4 shows part of the theoretical spectral profile of an optical fiber grating suitable for use as the first optical waveguide grating device in the laser of FIG. 1, the grating having two phase-shifts in its periodic refractive index variation, the two phase shifts producing two corresponding passbands within the spectral profile.
Figure 5:
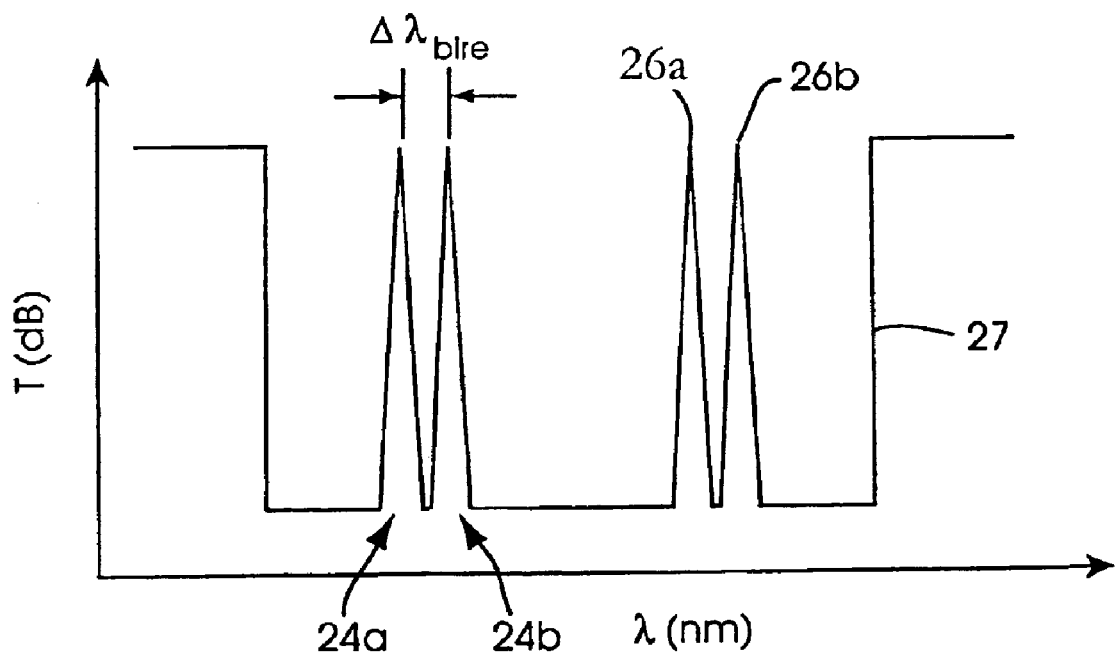
FIG. 5 shows the full theoretical spectral profile, including the effects of fiber birefringence, of the grating of FIG. 4.
Figure 6:
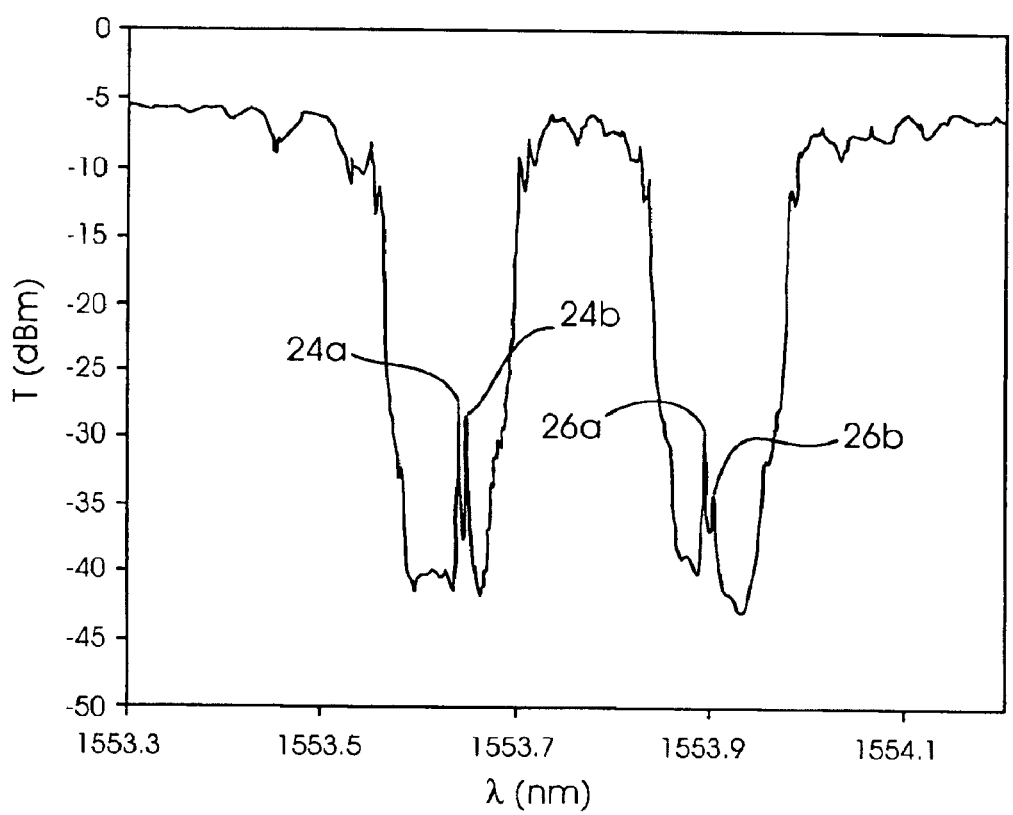
FIG. 6 shows the spectral profile of first optical waveguide grating device used in the laser of FIG. 1, the grating device comprising two co-located fiber Bragg gratings each having a single phase shift within their periodic refractive index variations.

The first fiber Bragg grating device 20 has a length of approximately 5 cm. The theoretical spectral profile in transmission (T) of the first grating device 20 is illustrated in FIGS. 4 and 5. The spectral profile in transmission (T) of the actual grating device 20 used is shown in FIG. 6. Referring to FIG. 4, each phase shift within the periodic refractive index variation of the grating device 20 gives rise to a passband 24, 26 within the grating's spectral profile. The wavelength separation between the two passbands is denoted as $\Delta\lambda$ in FIG. 4, and is approximately 0.25 nm in the first grating device 20. The spectral bandwidth of the passbands is very small (less than 1 pm) compared with the spectral bandwidth of the stopband of the grating device 20.

The Er—Yb fiber 18 in which the grating device 20 is fabricated has some inherent birefringence. However, during fabrication of the grating device 20, further birefringence is induced, in addition to the fiber's inherent birefringence, within the grating section 22 of the fiber 18. This occurs because the UV inscription beam is not uniform across the cross section of the fiber core, due to the beam size, and so the UV exposure across the fiber core is non-uniform. The birefringence of the fiber within the grating section 22 results in the splitting of each of the passbands 24, 26 into a pair of narrow peaks 24a, 24b and 26a, 26b, as shown in FIG. 5. The spacing between the peaks in each pair, $\Delta\lambda_{bire}$, depends on the magnitude of the total birefringence, and is approximately 0.009 nm (1 GHz) for this grating device 20.

The first grating device 20 defines a distributed optical fiber laser cavity which has two resonant wavelengths, set by the wavelengths of the two passbands 24, 26 in the spectral profile of the grating device 20. Because of the birefringence, there exist two orthogonal polarization modes at each resonant wavelength: two modes in the direction of the fast-axis of the grating section 22 (having a first polarization state); and two modes in the direction of the slow-axis of the grating section 22 (having the orthogonal polarization state). The presence of four peaks 24a, 24b, 26a, 26b within the transmission spectrum of the grating 20 therefore gives the laser cavity defined by the first grating device 20 four resonant modes, all of which share the same laser cavity and are linearly polarized.

Figure 7:
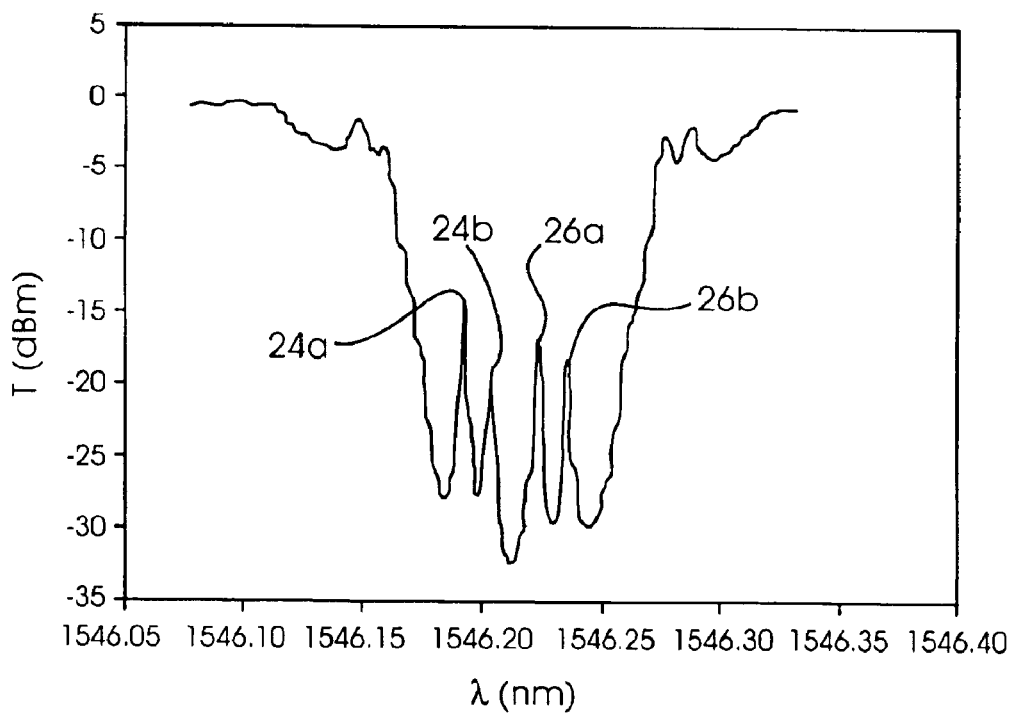
FIG. 7 shows the spectral profile of an alternative first optical waveguide grating device suitable for use in the laser of FIG. 1, the grating device comprising a single fiber Bragg grating having two phase shifts within its periodic refractive index variation.

The skilled person will appreciate that the first grating device 20 may be replaced by any optical waveguide grating device which has a periodic refractive index variation which gives the device a spectral profile having two passbands located within a stopband. In particular, the first grating device 20 may be replaced by a single fiber Bragg grating having two phase shifts within its periodic refractive index variation. The spectral profile of a suitable dual phase-shifted fiber Bragg grating is shown in FIG. 7. The same reference numerals are used for clarity.

Mode competition within the laser cavity defined by the first grating device 20 means that two modes of the same polarization cannot oscillate together stably. However, two orthogonally polarized modes can lase within a single cavity without suffering mode competition. The hi-bi fiber grating 30 is therefore used to provide the laser 10 with polarization mode selection. The operation is based on the principle of mode coupling.

In order to perform polarization mode selection, the wavelengths of the reflection peaks 38, 40 of the hi-bi grating 30 are set to match the wavelengths of a pair of orthogonally polarized modes of the laser cavity, corresponding to two of the four peaks in the transmission spectrum of the first grating device 20, i.e. 24a and 26b, or 24b and 26a, respectively. As a result, two of the four polarization modes are reflected, producing mode coupling within the laser cavity, and causing the laser 10 to lase at these two orthogonally polarized modes. The other two modes are transmitted by the hi-bi grating 30, and are therefore suppressed. As indicated, two different sets of orthogonal polarization modes can be selected, so the wavelength spacing between the two modes of the laser 10 can be selected to be $\Delta\lambda - \Delta\lambda_{bire}$ or $\Delta\lambda + \Delta\lambda_{bire}$.

The two selected orthogonal polarization modes can be regarded as two independent modes. If a laser cavity, here defined by the first grating device 20, and the active medium, Er—Yb fiber in this example, provide equal gains and losses for both polarizations, the laser will oscillate on the two modes simultaneously, independently, and with the same intensity.

To enable the wavelengths of the reflection peaks 38, 40 of the hi-bi grating 30 to be set to match the wavelengths of the chosen pair of orthogonally polarized modes of the laser cavity, the laser 10 further comprises a wavelength tuning device. In this example, the wavelength tuning device, shown in FIG. 8, takes the form of a Peltier heating element 46 to which the hi-bi fiber 28, including the grating section 32, is coupled. The birefringence in bow-tie hi-bi fiber 28 is stress-induced, which means that it is temperature-sensitive. By changing the temperature of the grating section 32 of the hi-bi fiber 28 the wavelength spacing between the reflection peaks 38, 40 of the hi-bi grating 30 can be tuned.

Figure 9:
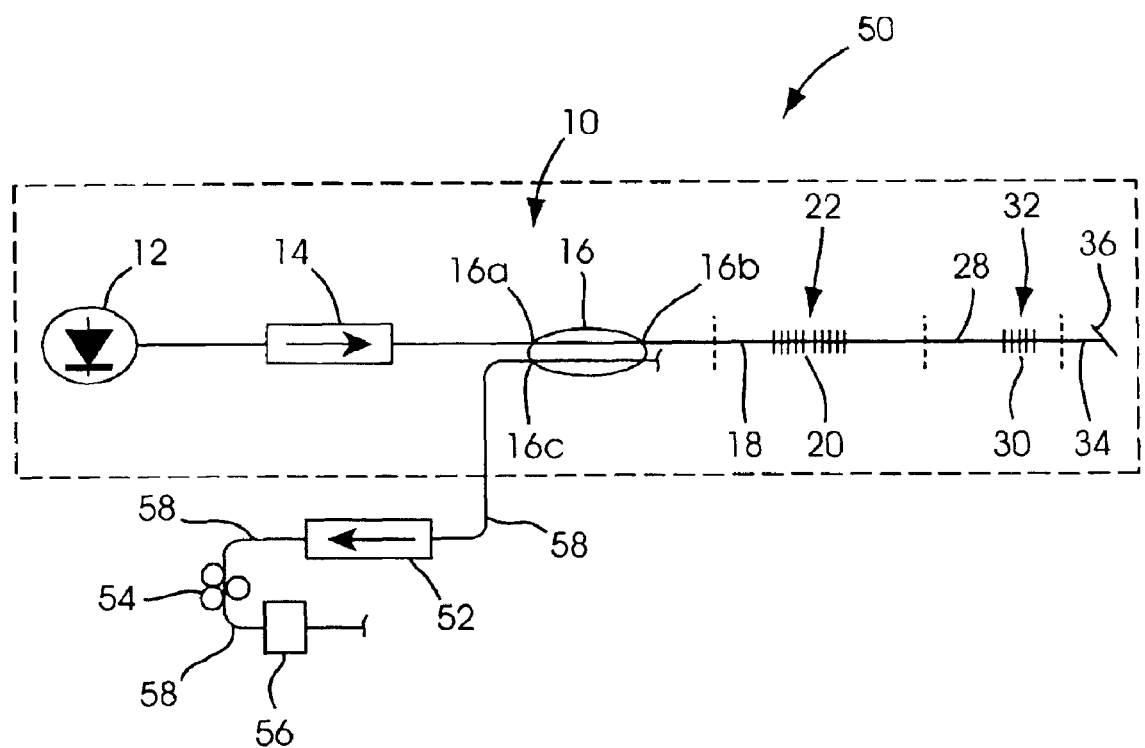
FIG. 9 is a diagrammatic representation of a photonic data carrying signal source according to a second aspect of the present invention.

Another embodiment of the present invention is directed to a photonic data carrying signal source 50, shown in FIG. 9. The photonic data carrying signal source 50 may comprise a dual wavelength optical waveguide laser 10 according to the first embodiment of the present invention, a second optical isolator 52, a polarization controller 54 and a polarization dependent optical modulator, which in this example takes the form of a gallium arsenide planar optical modulator 56.

The optical output signal from the laser 10 is coupled from the laser output (port 16c of the WDM coupler 16), through a section of standard monomode fiber (SMF) 58 to the second optical isolator 52, which in this example takes the form of a 1550 nm optical fiber isolator. The isolator 52 protects the laser 10 from any back reflections from subsequent optical components. The isolator 52 is optically coupled, via a second section of optical fiber 58, to the polarization controller 54 and through a third section of optical fiber 58 to the optical modulator 56. The orientation of the polarization axes of the two laser modes can be rotated by the polarization controller 54 in order to ensure that they lie within the operating parameters of the optical modulator 56.

Figure 10:
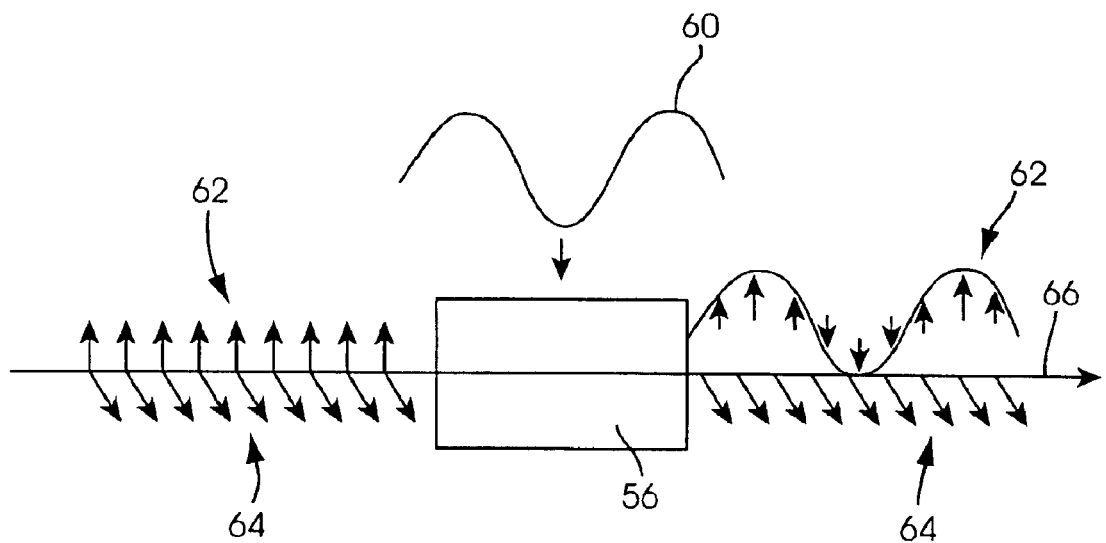
FIG. 10 is an illustration of the effect of the polarization dependent optical modulator of the photonic data carrying signal source of FIG. 9 on the two orthogonal polarization modes of the optical output signal from the dual wavelength laser.

The polarization dependent optical modulator 56 is operable to apply a data signal 60 to a selected one of the two orthogonal polarization modes 62, 64 of the optical output signal from the laser. In this example the data signal is applied by applying an amplitude modulation at the data signal frequency to the selected mode 62, as illustrated in FIG. 10. As the skilled person will appreciate, the data signal may alternatively or additionally be applied by applying a phase modulation to the selected polarization mode.

The modulated 62 and un-modulated 64 polarization modes together comprise a photonic data carrying signal 66 which can then be transmitted across an optical waveguide.

Figure 11:
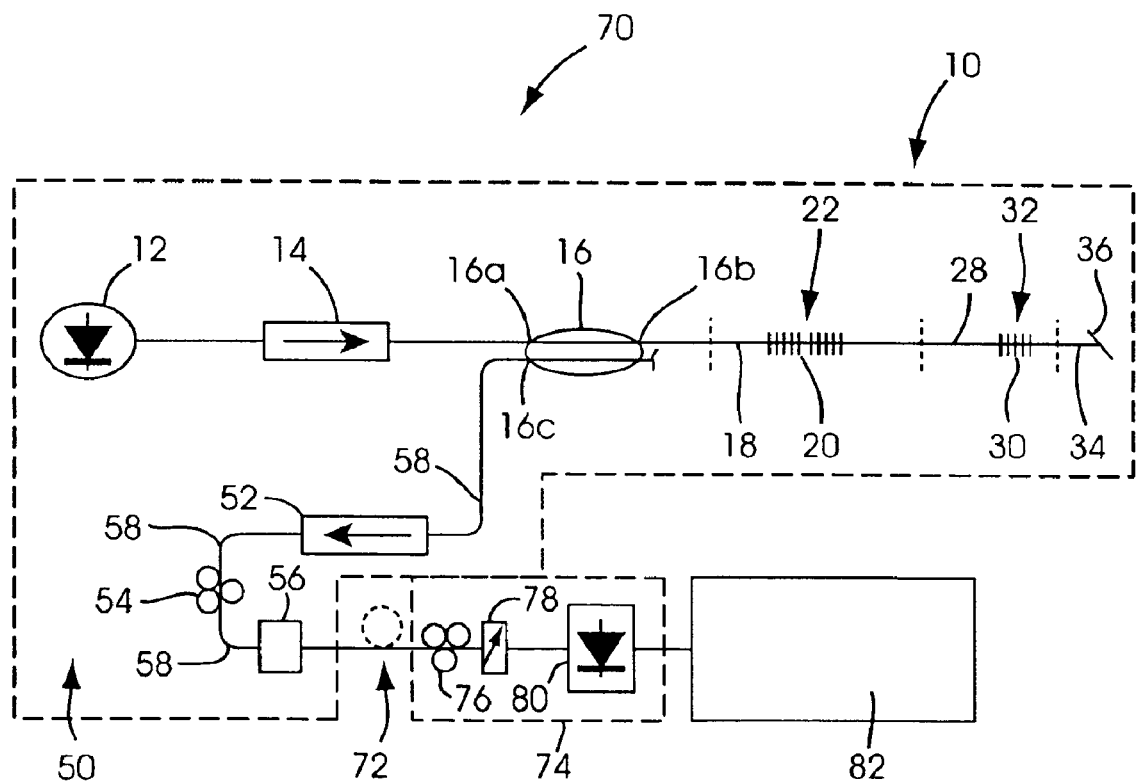
FIG. 11 is a diagrammatic representation of an optical waveguide based electronic signal transmission system according to a third aspect of the present invention.

A third embodiment of the present invention is directed to an optical waveguide based electronic signal transmission system 70, shown schematically in FIG. 11. The system 70 comprises a photonic data carrying signal source 50 according to the second embodiment of the invention, an optical waveguide transmission line, which in this example comprises an optical fiber transmission line 72, and a receiver 74 optically coupled to the transmission line 72 at its distal end.

The output of the photonic data carrying signal source 50 is optically coupled to the fiber transmission line 72, and the photonic data carrying signal 66 launched into, and transmitted across, the transmission line 72 to the receiver 74. In this example the receiver 74 comprises a polarization controller 76, optical polarizer in the form of a section of polarizing optical fiber 78, and optical detector in the form of an RF low noise photodetector 80.

The propagation axis of the polarizing fiber 78 is oriented at an angle of about forty-five degrees to the polarization axes of the two polarization modes 62, 64 of the photonic data carrying signal 66. In order to ensure that this requirement is met, the orientation of the polarization axes of the polarization modes 62, 64 may be rotated by the polarization controller 76.

On propagation through the polarizing fiber 78, the two orthogonal polarization modes 62, 64 heterodyne, thereby generating an electronic carrier in the optical domain. The electronic carrier in the optical domain has a beat frequency which is determined by the wavelength separation ($\Delta\lambda - \Delta\lambda_{bire}$ or $\Delta\lambda + \Delta\lambda_{bire}$) between the two polarization modes 62, 64.

Figure 8:
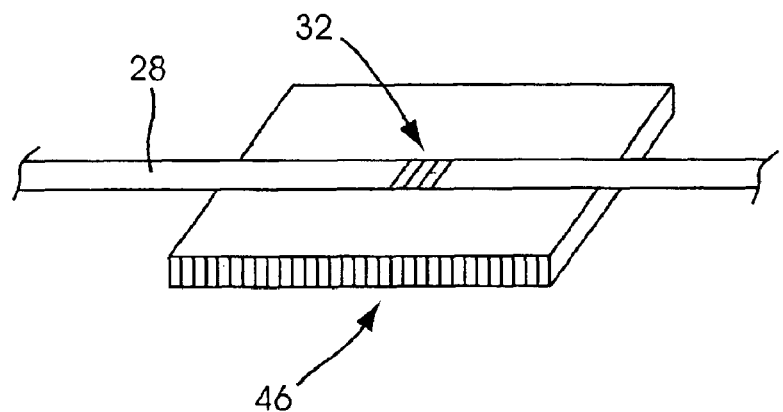
FIG. 8 is a diagrammatic representation of a wavelength tuning device suitable for use with the gratings of the laser of FIG. 1.

The wavelength spacing, $\Delta\lambda$, between the two passbands 24, 26 of the dual phase-shifted grating 20 determines the wavelength separation between the two polarization modes 62, 64. The wavelength spacing is selected during the fabrication of the grating 20, but it can be altered following fabrication by strain or temperature tuning the grating 20. The UV exposure induced birefringence, which determines $\Delta\lambda_{bire}$, can be tuned by using a Peltier heating device, as shown in FIG. 8, to provide for fine-tuning of the beat frequency of the electronic carrier in the optical domain.

The photodetector 80 is operable to detect the electronic carrier signal in the optical domain and convert it into an electrical signal. The RF spectrum of the electronic carrier in the optical domain can then be analysed by interrogating the electrical output signal from the photo detector 80 using an RF spectrum analyser 82, as shown in FIG. 11. The skilled person will understand that the RF spectrum analyser 82 is merely a measuring tool and does not form part of the system 70.

The total optical field of two orthogonally polarized laser modes 62, 64 can be expressed by, $$E = E_1 \exp[i(\omega_1 t + \phi_1)] + E_2 \exp[i(\omega_2 t + \phi_2)] \quad (1)$$

where $\omega_{1,2}$ are the two optical frequencies corresponding to $\lambda 1$ and $\lambda 2$, and $\phi_{1,2}$ are the phase noises for the corresponding modes. The photocurrent I generated by direct detection, using the photodetector 80, of the optical field defined by (1) is proportional to E·E*, given by, $$I \propto E_1^2 + E_2^2 + 2E_1 E_2 \cos[(\omega_1 - \omega_2)t + (\phi_1 - \phi_2)] \quad (2)$$

The difference between the two optical frequencies $\omega_1$ and $\omega_2$, is the beat frequency, and can be selected to lie within any desired frequency range, such as the radio frequency, microwave or millimeter wave frequency ranges, by appropriate fabrication of the first grating 20.

Generally, the phase noise, $\phi_1$ and $\phi_2$, on two orthogonal laser modes varies at a high frequency. If the two modes originate from different optical cavities the phase noises present on each mode will be uncorrelated to one another. The difference between the phase noises will produce a high frequency noise source which will consequently give rise to a large linewidth in the beat frequency of the electronic carrier in the optical domain. However, if, as is the case here, the two modes originate from the same laser cavity, the phase noise, and hence the linewidth, may be very small.

Figure 12:
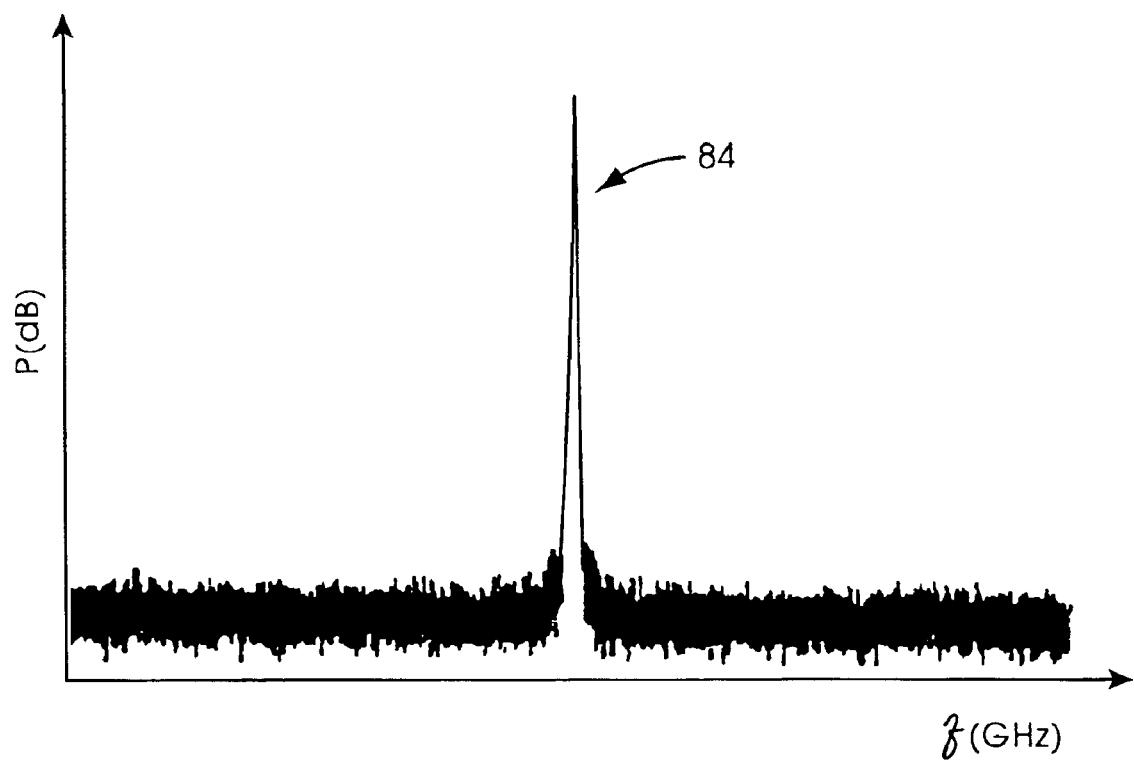
FIG. 12 shows the RF spectrum of a photonic carrier signal generated by the photonic data carrying signal source of FIG. 9.

FIG. 12 shows the $RF_{power\,(P)}$ spectrum 84 of the electronic carrier in the optical domain generated in the optical waveguide based electronic signal transmission system shown in FIG. 11. The electronic carrier has a beat frequency of 20 GHz and a linewidth of less than 1 kHz.

The above described embodiments of the invention provide a new approach to using a fiber Bragg grating distributed feedback laser for generating an electronic carrier in the optical domain at useful frequencies. The electronic carrier has a narrow linewidth. The invention exploits the common mode rejection in the beat signal between two optical modes of orthogonal polarization oscillating in the same DFB fiber laser cavity.

The above described dual wavelength optical waveguide laser is used to generate a photonic data carrying signal having the advantage of a narrower intrinsic optical linewidth, and consequently narrower electrical linewidth, than would be available using a semiconductor laser.

The described optical waveguide based electronic signal transmission system, in which generation of the electronic carrier in the optical domain occurs after transmission across the optical waveguide transmission line, provides a significant advantage over known optical fiber microwave systems which use direct modulation of the laser source or amplitude modulation at the electronic carrier frequency of the optical signal. Because the photonic data carrying signal source applies a modulation to one of the polarization modes at the data signal frequency, which is much lower than the desired electronic carrier frequency, the wavelength/frequency separation between the generated sidebands and the selected mode (optical carrier) is much smaller than is the case with the direct modulation of the laser source or amplitude modulation at the electronic carrier frequency of the optical signal. As a result, the effects of chromatic dispersion are significantly reduced and, consequently, the achievable transmission distance is greatly increased (to approximately 14683 kilometers for a 500 MHz modulation/data frequency on a 1550 nm optical signal propagating in SMF).

The photonic data carrying signal source described provides convenient baseband modulation, at the data signal frequency, through the use of a polarization dependent external optical modulator.

The use of a grating having two phase shifts within its periodic refractive index variation in the dual wavelength laser offers the advantage of flexibility in setting the wavelength spacing between the resonances of the two phase-shifts. This enables control of the beat frequency of the electronic carrier in the optical domain, with frequencies of up to 60 GHz being achievable.

The use of two orthogonal polarization lasing modes provides the advantage that both modes can lase stably without suffering mode competition within the laser cavity. The use of a hi-bi fiber grating for polarization mode coupling provides the advantage of a very compact structure, and ensures the two selected lasing modes oscillate within substantially the same optical cavity. This provides the further advantage of both lasing modes having the same phase noise, resulting in a narrow optical linewidth. Narrow electrical linewidth of the generated electronic carrier in the optical domain (<1 kHz) can therefore be attained without the use of any additional control or feedback system.

Various modifications may be made without departing from the scope of the invention. For example, the dual wavelength optical waveguide laser may operate at wavelengths which are different to those described above. As a consequence, the pump laser may be of a different type or operate at a different wavelength, and a different optical isolator and WDM coupler may be used. The optical waveguide grating devices may be provided within a different waveguide type, such as a different type of optical fiber or a planar optical waveguide. The optical waveguide grating devices may also have different spectral characteristics to those described above. The wavelength tuning devices described may also be of a different form. In addition, the output laser output may be at the distal end of the SMF 36 rather than at the WDM coupler port 16c as described.

As the skilled person will appreciate, each possible orthogonal pair of the four resonant modes of the laser cavity can heterodyne to generate a beat frequency related to their wavelength spacing. Therefore a different pair of orthogonal polarization modes may be utilised to those detailed above.

The photonic data carrying signal source, and the optical waveguide based electronic data transmission system, may utilise a different optical isolator. The transmission system may also use a different optical polarizing means to that described, such as a bulk optic polarizer. These optical elements may be connected using a different type of optical fiber, or optical waveguide.

Referring in particular to the photonic data carrying signal source, a different polarization dependent optical modulator may be used to that described.

The optical waveguide based electronic signal transmission system described may include a feedback system, such as an optical phase-locked loop, for improving the electrical linewidth of the generated electronic carrier in the optical domain. This is possible due to the low phase noise present on the optical output from the dual wavelength laser.

What is claimed is:

1. An optical system, comprising:
   a dual wavelength optical waveguide laser comprising a first optical waveguide containing an optical gain medium, the first optical waveguide including a first grating section in which a first optical waveguide grating device is provided, the first optical waveguide grating device having a periodic refractive index variation which gives the first optical waveguide grating device a spectral profile having two passbands located within a stopband,
   the first grating section being birefringent,
   the first optical waveguide grating device defining at least one distributed optical waveguide laser cavity,
   the first optical waveguide being optically coupled at one end to a second optical waveguide including a second grating section in which a second optical waveguide grating device is provided,
   the first optical waveguide grating device, in combination with the first birefringent grating section, giving rise to two potential lasing modes of a first polarization state and two potential lasing modes of a second polarization state orthogonal to the first polarization state, each potential lasing mode being of a different wavelength,
   the second optical waveguide grating device selecting one of the potential lasing modes of the first polarization state and one of the potential lasing modes of the second polarization state for oscillation; and
   a pump laser, operable to generate a pump optical signal, in optical communication with the first optical waveguide.

2. A system as claimed in claim 1, wherein the periodic refractive index variation of the first optical waveguide grating device includes two phase-shifts which respectively give rise to the two passbands within the spectral profile.

3. A system as claimed in claim 1, wherein the first optical waveguide grating device comprises a single optical waveguide grating having two phase-shifts within its periodic refractive index variation.

4. A system as claimed in claim 1, wherein the first optical waveguide grating device comprises two optical waveguide gratings, each of the two optical waveguide gratings having a single phase-shift within its periodic refractive index variation, the two optical waveguide gratings being co-located within the first grating section, and thus being substantially superimposed on one another, thereby defining two co-located distributed feedback optical waveguide laser cavities.

5. A system as claimed in claim 1, wherein the second optical waveguide grating device is a polarization mode-coupling optical waveguide grating.

6. A system as claimed in claim 1, wherein the second optical waveguide is a high birefringence optical fiber.

7. A system as claimed in claim 5, wherein the polarization mode-coupling optical waveguide grating has an optical spectrum having first and second reflection peaks corresponding to a fast axis and a slow axis of the second optical waveguide respectively,
   the wavelengths corresponding to the first peak including the wavelength of one of the two potential lasing modes of the first polarization state of the laser,
   and the wavelengths corresponding to the second peak including the wavelength of one of the two potential lasing modes of the orthogonal polarization state of the laser,
   light in one of the two potential lasing modes of the first polarization state being reflected by the polarization mode-coupling grating, and light in the other mode of the two potential lasing modes of the first polarization state being transmitted through the polarization mode-coupling grating,
   light in one of the two potential lasing modes of the second polarization state being reflected by the polarization mode-coupling grating, and light in the other mode of the two potential lasing modes of the second polarization state being transmitted through the polarization mode-coupling grating.

8. A system as claimed in claim 4, wherein at least one of the optical waveguide gratings is a fiber Bragg grating.

9. A system as claimed in claim 1, the optical output signal from the dual wavelength laser being optically coupled to a polarization dependent optical modulator operable to apply a data signal to a selected one of the first and second polarization modes of the optical output signal from the dual wavelength laser by applying at least one of an amplitude and a phase modulation at the data signal frequency to the selected mode.

10. A system as claimed in claim 9, wherein the data carrying optical output signal from the signal source is optically coupled to an optical waveguide transmission line; and further comprising
   a receiver optically coupled to the transmission line at its distal end, the receiver including
   an optical polarizer having a propagation axis oriented at an angle of substantially forty-five degrees to the polarization axes of the two orthogonal polarization modes of the data carrying optical output signal from the signal source, such that on propagation through the optical polarizer the two orthogonal polarization modes heterodyne, thereby generating an electronic carrier signal in the optical domain, the electronic carrier signal having a beat frequency determined by the wavelength separation between the two orthogonal polarization modes and the electronic carrier signal being modulated at the data signal frequency.

11. A system as claimed in claim 10, wherein the optical polarizer is one of a polarizing optical waveguide and a bulk optic polarizer.

12. A system as claimed in claim 10, wherein the receiver comprises an optical detector in optical communication with the optical polarizer, the optical detector detecting the electronic carrier signal in the optical domain and converting the electronic carrier signal in the optical domain into an electrical signal.

13. A system as claimed in claim 10, wherein the beat frequency of the electronic carrier signal in the optical domain lies within one of the radio frequency, microwave and millimeter wave frequency ranges and the frequency of the data signal is lower than the beat frequency of the electronic carrier signal.

14. A dual wavelength optical waveguide laser, comprising:

a first optical waveguide comprising an optical gain medium and a first grating section, the first grating section comprising a first optical waveguide grating device having a periodic refractive index variation giving the first optical waveguide grating a spectral profile having two passbands located within a stopband, the first grating section being birefringent and the first optical waveguide grating device further comprising at least one distributed laser cavity the first grating device thereby defining two potential oscillation wavelengths of a first polarization state and two potential oscillation wavelengths of a second polarization state orthogonal to the first polarization state, each potential oscillation wavelength being different;

and a second optical waveguide optically coupled to one end of the first optical waveguide, the second optical waveguide comprising a second grating section, a second, mode-selecting optical waveguide grating device being provided in the second grating section;

wherein the second optical waveguide grating device selects a pair of orthogonally polarized potential oscillation wavelengths for laser oscillation.

15. A laser as claimed in claim 14, further comprising a pump laser coupled to direct pump light into the first optical waveguide grating device of the first optical waveguide.

16. A laser as claimed in claim 14, wherein the periodic refractive index variation of the first optical waveguide grating device includes two phase-shifts giving rise to the two passbands within the spectral profile.

17. A laser as claimed in claim 14, wherein the first optical waveguide grating device comprises two optical waveguide gratings, each of the two optical waveguide gratings having a single phase-shift within its periodic refractive index variation, the two optical waveguide gratings being co-located with, and superimposed on, each other within the first grating section.

18. A laser as claimed in claim 14, further comprising an optical modulator coupled to receive an output from the laser cavity and to apply a data signal to a selected one of the first and second polarization modes of the optical output signal from laser cavity by applying at least one of an amplitude and a phase modulation at the data signal frequency to the selected mode.

* * * * *